United States Patent
Ito et al.

(10) Patent No.: US 7,365,150 B2
(45) Date of Patent: Apr. 29, 2008

(54) PROCESS FOR PRODUCING POLYESTER RESIN FOR TONER

(75) Inventors: Hirokazu Ito, Toyohashi (JP); Masaru Sugiura, Toyohashi (JP); Kouji Shimizu, Toyohashi (JP); Hitoshi Iwasaki, Toyohashi (JP)

(73) Assignee: Mitsubishi Rayon Co., Ltd., Tokyo (JP)

( * ) Notice: Subject to any disclaimer, the term of this patent is extended or adjusted under 35 U.S.C. 154(b) by 0 days.

(21) Appl. No.: 10/481,447

(22) PCT Filed: Jun. 19, 2002

(86) PCT No.: PCT/JP02/06126

§ 371 (c)(1),
(2), (4) Date: Dec. 19, 2003

(87) PCT Pub. No.: WO03/001302

PCT Pub. Date: Jan. 3, 2003

(65) Prior Publication Data

US 2004/0152005 A1    Aug. 5, 2004

(30) Foreign Application Priority Data

Jun. 20, 2001 (JP) ............................ 2001-186215

(51) Int. Cl.
*C08K 5/00* (2006.01)
(52) U.S. Cl. .................... 528/272; 524/284; 430/109.4
(58) Field of Classification Search ............ 430/109.4; 524/878, 284; 528/272
See application file for complete search history.

(56) References Cited

U.S. PATENT DOCUMENTS

| 4,514,487 | A | * | 4/1985 | Kasuya et al. ......... 430/137.15 |
| 4,980,448 | A | | 12/1990 | Tajiri et al. |
| 5,057,596 | A | | 10/1991 | Kubo et al. |
| 5,153,301 | A | | 10/1992 | Tajiri et al. |
| 5,270,436 | A | | 12/1993 | Kubo et al. |
| 5,276,127 | A | | 1/1994 | Takyu et al. |
| 5,409,989 | A | | 4/1995 | Ito et al. |
| 5,789,527 | A | * | 8/1998 | Nakamichi et al. ......... 528/272 |
| 6,007,958 | A | | 12/1999 | Ito et al. |
| 6,054,244 | A | * | 4/2000 | Kato et al. ............. 430/137.16 |
| 6,153,347 | A | | 11/2000 | Kabai et al. |
| 6,337,169 | B1 | * | 1/2002 | Hashimoto et al. ......... 430/126 |

FOREIGN PATENT DOCUMENTS

| JP | 62-143060 | 6/1987 |
| JP | 5-100479 | 4/1993 |
| JP | 6-93026 | 4/1994 |
| JP | 11-219057 | 8/1999 |
| JP | 11-295919 | 10/1999 |
| JP | 2000-1532 | 1/2000 |

* cited by examiner

*Primary Examiner*—John L Goodrow
(74) *Attorney, Agent, or Firm*—Oblon, Spivak, McClelland, Maier & Neustadt, P.C.

(57) ABSTRACT

A polyester resin for toner which is obtained through polymerization in the presence of a release agent ingredient with a melting point of 60–100° C. or a release agent ingredient comprising an alcohol component, and which has a softening temperature of 100–160° C., an acid value of 0.1–30 mgKOH/g and a glass transition temperature of 40–70° C.; a process for producing a polyester resin for toner which comprises conducting polymerization in the presence of a release agent ingredient with a melting point of 60–100° C. or a release agent ingredient comprising an alcohol component; and toner comprising the polyester resin. Toners with excellent non-offset properties and glosses are obtained.

5 Claims, No Drawings

PROCESS FOR PRODUCING POLYESTER RESIN FOR TONER

TECHNICAL FIELD

The present invention relates to a polyester resin for toner, to a process for producing the polyester resin for toner and to toner containing it. The invention relates more particularly to a polyester resin which is used for development of electrostatic charge images or magnetic latent images in electrophotographic methods, electrostatic recording methods or electrostatic printing methods, and can give toner with an excellent non-offset property and gloss, as well as to a process for producing the polyester resin.

BACKGROUND ART

In methods for obtaining images by electrophotographic printing and electrostatic charge development, an electrostatic charge image formed on a photosensitive body is developed by toner which has been previously charged by friction, and then fixed. Fixing systems include heat roller systems wherein the toner image obtained by development is fixed using a pressurized or heated roller, and noncontact fixing systems wherein fixing is accomplished using an electric oven or a flash of light. In order to carry out the process in a successful manner, the toner must first hold a stable charge, and must secondly have a satisfactory property of fixing onto paper. In addition, as the apparatus has a heated fixing member which increases the temperature inside the apparatus, the toner must also be resistant to blocking. Recently, with the increased compactness of fixing members in heat roller systems, rollers are being employed that are not coated with release agents such as silicone oil. This has produced a high demand for toners with releasability from heat rollers, also known as a non-offset property. Also, recently, in demand are toners capable of forming glossy images, as full color electrophotographic systems come into wider use.

Toner binder resins, which have a major influence on the above-mentioned toner properties, include polystyrene resins, styrene-acryl resins, polyester resins, epoxy resins, polyamide resins and the like, and particular attention has been focused on polyester resins for their ability to achieve a satisfactory balance between transparency and fixing property, as well as their superior transparency and general suitability for full color toners.

However, toners using polyester-based resins as the binder resins tend to have a lower non-offset property than other resins such as styrene-acryl resins, while it has also been difficult to simultaneously achieve sufficient gloss.

One problem, for example, has been that enhancing the non-offset property of a toner by increasing the polymer weight or elasticity of the binder resin also lowers the gloss of the resulting image.

Moreover, it has not been possible to obtain adequate effects because release agents added to toners are not readily uniformly miscible in the binder resins.

DISCLOSURE OF THE INVENTION

It is an object of the present invention to provide a polyester resin for toner which can give toner with an excellent non-offset property and gloss, as well as a process for producing the polyester resin for toner and toner containing it.

As a result of diligent research on release agent ingredients added to polyester resins for toner, the present inventors have completed this invention upon discovering a solution to the aforementioned problems.

Specifically, the present invention provides a polyester resin for toner which is obtained through polymerization in the presence of a release agent ingredient with a melting point of 60–100° C. or a release agent ingredient comprising an alcohol component, and which has a softening temperature of 100–160° C., an acid value of 0.1–30 mgKOH/g and a glass transition temperature of 40–70° C.

The invention further provides a process for producing a polyester resin for toner which comprises conducting polymerization of a polyester monomer ingredient in the presence of a release agent ingredient with a melting point of 60–100° C. or a release agent ingredient comprising an alcohol component.

The invention still further provides a toner containing at least the polyester resin for toner described above, which produces fixed images with a gloss of 5 to 40 degrees.

BEST MODE FOR CARRYING OUT THE INVENTION

The release agent ingredient as a constituent of the polyester resin for toner according to the invention has a melting point in the range of 60–100° C. This range is specified because a melting point of at least 60° C. will tend to result in satisfactory blocking resistance of the toner. The melting point is preferably at least 65° C. Also, a melting point of up to 100° C. will tend to result in a satisfactory low-temperature fixing property of the toner. The melting point is preferably no higher than 95° C.

As examples of release agent ingredients with melting points of 60–100° C. there may be mentioned rice wax (m.p.: 79° C.), carnauba wax (m.p.: 83° C.), paraffin wax (m.p. 40–90° C.) and bees wax (m.p.: 64° C.).

One or more of these may be selected as appropriate depending on the need.

The release agent ingredient as a constituent of the polyester resin for toner according to the invention may also comprise an alcohol component. By using a polyester resin comprising an alcohol component, part of the alcohol component reacts with the monomer ingredient during polymerization of the polyester resin, thereby enhancing the compatibility of the polymer ingredient with the release agent ingredient, allowing the dispersion size of the release agent ingredient to be smaller in the polyester resin for toner according to the invention, and tending to result in a toner with a more satisfactory non-offset property and gloss.

The release agent ingredient preferably has a penetration degree of no greater than 3 at 25° C., because using a release agent with a penetration degree of no greater than 3 at 25° C. will tend to give toner with satisfactory image stability.

As examples of release agent ingredients comprising alcohol components and having penetration degrees of no greater than 3 at 25° C. there may be mentioned rice wax and carnauba wax, with carnauba wax being particularly preferred.

Such release agent ingredients are preferably included in the polyester resin for toner of the invention in an amount of 0.1–10 wt %. A release agent ingredient content of at least 0.1 wt % will tend to give toner with a satisfactory non-offset property. The content is more preferably at least 0.5 wt %. The content is also no greater than 10 wt % because this will tend to give toner with satisfactory gloss and image stability. The content is more preferably no greater than 8 wt %.

According to the invention, the dispersion size of the release agent ingredient in the polyester resin for toner is preferably no greater than 5 μm. A dispersion size of no greater than 5 μm will tend to give toner with a satisfactory non-offset property and gloss. The dispersion size is more preferably no greater than 3 μm.

The dispersion size of the release agent ingredient in the polyester resin for toner is determined by melt blending the polyester resin with a twin-screw extruder controlled to an external temperature of 120° C., sandwiching 2 g of the blended resin between polyester films, holding it for 2 minutes while applying a load of 9.8 MPa at 180° C., and then cooling it to prepare a sample, observing and photographing the dispersion state of the release agent in the sample under a light microscope, selecting the largest dispersed particle and determining the value of the maximum distance from the center of the dispersed particle to the outermost perimeter.

As examples of useful dicarboxylic acid components as constituents of the polyester resin for toner according to the invention there may be mentioned terephthalic acid, isophthalic acid and their lower alkyl esters. As examples of lower alkyl esters of terephthalic acid and isophthalic acid there may be mentioned dimethyl terephthalate, dimethyl isophthalate, diethyl terephthalate, diethyl isophthalate, dibutyl terephthalate and dibutyl isophthalate, but terephthalic acid and isophthalic acid are preferred from the standpoint of handling properties and cost. These dicarboxylic acids or their lower alkyl esters may be used alone or in combinations of two or more.

As examples of other useful dicarboxylic acid components there may be mentioned phthalic acid, sebacic acid, isodecylsuccinic acid, dodecenylsuccinic acid, maleic acid, fumaric acid, adipic acid and their monomethyl, monoethyl, dimethyl and diethyl esters or their acid anhydrides. Such dicarboxylic acid components will influence the basic properties of the toner including the fixing property and blocking resistance, and may therefore be used as appropriate for the required performance, in ranges that do not hinder the object of the invention.

As examples of useful glycol components as constituents of the polyester resin for toner according to the invention there may be mentioned aromatic diol components such as polyoxyethylene-(2.0)-2,2-bis(4-hydroxyphenyl)propane, polyoxypropylene(2.0)-2,2-bis(4-hydroxyphenyl)propane, polyoxypropylene-(2.2)-polyoxyethylene-(2.0)-2,2-bis(4-hydroxyphenyl)propane, polyoxypropylene(6)-2,2-bis(4-hydroxyphenyl)propane, polyoxypropylene(2.2)-2,2-bis(4-hydroxyphenyl)propane, polyoxypropylene-(2.4)-2,2-bis(4-hydroxyphenyl)propane and polyoxypropylene(3.3)-2,2-bis(4-hydroxyphenyl)propane, which may be used either alone or in combinations of two or more. Aromatic diol components have the effect of increasing the glass transition temperature and thus yield toners with satisfactory blocking resistance. Particularly preferred are polyoxypropylene(n)-2,2-bis(4-hydroxyphenyl)propane having a polyoxypropylene unit number (n) of $2.1 \leq n \leq 8$ and polyoxyethylene(n)-2,2-bis(4-hydroxyphenyl)propane having a polyoxyethylene unit number (n) of $2.0 \leq n \leq 3.0$.

These aromatic diol components are preferably used in amounts in the range of 10–110 mole percent and more preferably in the range of 20–100 mole percent based on the total acid component.

As examples of other useful glycol components there may be mentioned ethylene glycol, neopentyl glycol, propylene glycol, butanediol, polyethylene glycol, 1,2-propanediol, 1,4-butanediol, diethylene glycol, triethylene glycol, 1,4-cyclohexanedimethanol and hydrogenated bisphenol A, which may be used either alone or in combinations of two or more.

As constituents of the polyester resin for toner of the present invention there are preferably used tri- or higher polyvalent carboxylic acids and/or tri- or higher polyhydric alcohols.

Tri- or higher polyvalent carboxylic acids and/or tri- or higher polyhydric alcohols are used for crosslinking or branching of the polyester resin, and they are preferably used in an amount in the range of 0.1–30 mole percent based on the total acid component. This is because their use in an amount of at least 0.1 mole percent will tend to give toner with a satisfactory non-offset property. The amount is more preferably at least 0.5 mole percent. Also, their use in an amount of no greater than 30 mole percent will tend to ensure that toner with satisfactory blocking resistance and a satisfactory fixing property is obtained. The amount is more preferably no greater than 28 mole percent.

As examples of tri- or higher polyvalent carboxylic acids there may be mentioned trimellitic acid, pyromellitic acid, 1,2,4-cyclohexanetricarboxylic acid, 2,5,7-naphthalenetricarboxylic acid, 1,2,4-naphthalenetricarboxylic acid, 1,2,5-hexanetricarboxylic acid and 1,2,7,8-octanetetracarboxylic acid or their anhydrides or lower alkyl esters, and as examples of tri- or higher polyhydric alcohols there may be mentioned sorbitol, 1,2,3,6-hexanetetraol, 1,4-sorbitan, pentaerythritol, dipentaerythritol, tripentaerythritol, 1,2,4-butanetriol, 1,2,5-pentanetriol, glycerol, 2-methyl-1,2,3-propanetriol, 2-methyl-1,2,4-butanetriol, trimethylolpropane and 1,3,5-trihydroxymethylbenzene. Particularly preferred are trimellitic acid or its anhydride, pentaerythritol and trimethylolpropane, and these tri- or higher polyvalent carboxylic acids and tri- or higher polyhydric alcohols may be used alone or in combinations of two or more.

According to the invention, it is important for the dicarboxylic acid component and glycol component and, if necessary, a tri- or higher polyvalent carboxylic acid and/or a tri- or higher polyhydric alcohol, to be polymerized by esterification reaction or ester-exchange reaction and condensation reaction in the presence of the aforementioned release agent ingredient, in order to produce the polyester resin. This will tend to yield a polyester resin for toner with a further improved non-offset property, gloss and fixing property.

A polymerization catalyst such as titanium tetrabutoxide, dibutyltin oxide, tin acetate, zinc acetate, tin disulfide, antimony trioxide or germanium dioxide may be used for polymerization of the polyester resin.

The polymerization temperature for the polyester resin for toner of the invention is preferably in the range of 180–280° C. A polymerization temperature of at least 180° C. will permit reaction between the release agent ingredient, such as carnauba wax, and the monomer ingredient for improved compatibility between the polymer ingredient and the release agent ingredient, thereby tending to allow a smaller dispersion size for the release agent ingredient in the polyester resin for toner of the invention. The temperature is more preferably at least 200° C. Also, a polymerization temperature of no higher than 280° C. will tend to inhibit coloration of the release agent ingredient and result in satisfactory toner gloss. The temperature is more preferably no higher than 270° C.

The polyester resin for toner of the invention preferably has a softening temperature in the range of 100–160° C. A softening temperature of below 100° C. will tend to reduce the blocking resistance of the toner. The softening temperature is more preferably at least 105° C. Also, the toner will tend to have reduced gloss if the softening temperature is higher than 160° C. The softening temperature is more preferably no higher than 150° C. The polyester resin for toner of the invention also preferably has a melting point peak in the range of 60–100° C.

The polyester resin for toner of the invention also preferably has an acid value in the range of 0.1 to 30 mgKOH/g. This is because the productivity of resins with acid values of less than 0.1 mgKOH/g tends to be poor. The acid value is more preferably at least 0.5 mgKOH/g. Also, the image stability will tend to be reduced if the acid value is greater than 30 mgKOH/g. The acid value is more preferably no greater than 25 mgKOH/g.

The polyester resin for toner of the invention preferably has a glass transition temperature in the range of 40–70° C. This is because a glass transition temperature of below 40° C. will tend to reduce the blocking resistance of the toner. The glass transition temperature is more preferably at least 50° C. Also, a glass transition temperature of higher than 70° C. will tend to reduce the gloss of the toner. The glass transition temperature is more preferably no higher than 65° C.

The polyester resin for toner of the invention is used as a binder resin, and coloring agents, charge control agents, flow modifiers, magnetic substances and the like may be added thereto to obtain toner.

The above-mentioned release agent or other release agents may be added during production of the toner if necessary, in ranges that do not impede the object of the invention. The amount of the release agent ingredient T added during production of the toner and the amount of the release agent ingredient P used for production of the resin, i.e. during polymerization of the monomer, are preferably in a ratio T/P in the range of 1–100, and more preferably in the range of 0.2–80.

As additional release agents there may be mentioned polypropylene-based waxes, polyethylene-based waxes, synthetic ester-based waxes, paraffin waxes, fatty acid amides, silicone-based waxes and the like.

As coloring agents to be used in the toner of the invention there may be mentioned carbon black, nigrosine, aniline blue, phthalocyanine blue, phthalocyanine green, hansa yellow, rhodamine-based dyes or pigments, chrome yellow, quinacridone, benzidine yellow, rose bengal, triallyl-methane-based dyes and monoazo-based, disazo-based and condensed azo-based dyes or pigments, and such dyes or pigments may be used alone or in combinations of two or more. In the case of full color toner, benzidine yellow, monoazo-based dyes, condensed azo-based dyes and the like may be used for yellow, quinacridone dyes, rhodamine-based dyes, monoazo-based dyes and the like may be used for magenta, and phthalocyanine blue and the like may be used for cyan. From the standpoint of the toner color tone, image density and thermal properties, the coloring agent is preferably used in an amount of about 2–10 wt % in the toner.

As charge control agents to be used in the toner of the invention there may be mentioned positive charge control agents such as quaternary ammonium salts and basic or electron donating organic substances, and negative charge control agents such as metal chelates, alloy dyes and acidic or electron accepting organic substances. In the case of color toner, it is important for the charge control agent to be colorless or light-colored so as not to impair the color tone of the toner, and such agents include salicylic acid or alkylsalycylic acid metal salts or metal chelates of chromium, zinc, aluminum or the like, amide compounds, phenol compounds, and naphthol compounds. These charge control agents are preferably used in amounts of 0.5–5 wt % in the toner. A charge control agent amount of at least 0.5 wt % will ensure a sufficient level of charge to the toner, while an amount of no greater than 5 wt % will tend to inhibit reduction in charge due to aggregation of the charge control agent.

As flow modifiers or other additives to be used in the toner of the invention there may be mentioned flow modifiers such as fine powdered silica, alumina or titania, inorganic fine powders such as magnetite, ferrite, cerium oxide, strontium titanate and conductive titania, resistance regulators such as styrene resins and acrylic resins or lubricants, which may be used either as internal or external additives. Such additives are preferably used in amounts of 0.05–10 wt % in the toner. Use of such additives in amounts of at least 0.05 wt % will tend to ensure an adequate effect of enhanced performance of the toner, while amounts of no greater than 10 wt % will tend to guarantee satisfactory image stability of the toner.

The toner of the invention may be used as a magnetic single-ingredient developing agent, a non-magnetic single-ingredient developing agent or a two-ingredient developing agent. When used as a magnetic single-ingredient developing agent it will contain a magnetic substance, and as examples of magnetic substances there may be mentioned magnetic alloys of iron, cobalt, nickel and the like such as ferrite and magnetite, as well as alloys containing no magnetic compounds or elements but exhibiting magnetism when subjected to appropriate heat treatment, for example, Heuslar alloys which contain manganese and copper, such as manganese-copper-aluminum or manganese-copper-tin, or chromium dioxide and the like. Such magnetic substances are preferably used in amounts in the range of 40–60 wt % in the toner. Using a magnesium substance in an amount of at least 40 wt % will tend to result in toner with an adequate level of charge, while an amount of no greater than 60 wt % will tend to ensure that toner with a satisfactory fixing property is obtained. When a two-ingredient developing agent is used, it will be in combination with a carrier. As carriers there may be used publicly known magnetic carriers, including magnetic substances such as iron powder, magnetite powder or ferrite powder, and such substances having resin coatings on the surface. As coating resins for resin coated carriers there may be utilized commonly known styrene-based resins, acrylic-based resins, styrene-acrylic copolymer-based resins, silicone-based resins, modified silicone-based resins, fluorine-based resins and mixtures of such resins.

The toner of the invention may be produced by first mixing the aforementioned polyester resin for toner with the coloring agents, charge control agent, flow modifier, magnetic substance, etc., melt blending the mixture with a twin-screw extruder or the like and subjecting it to crude pulverization, fine pulverization and classifying, with external addition of inorganic particles if necessary. The blending step is preferably carried out with the internal temperature of the extruder cylinder higher than the softening temperature of the polyester resin. The step may also be carried out with processing of the toner particles into spheres after fine pulverization and classifying.

It is also important for the toner of the invention to have a gloss of 5 to 40 degrees. Toner with a gloss of less than 5 degrees will tend to have poor coloration and yield images with inferior gloss. The gloss is more preferably at least 10 degrees. Also, a gloss of greater than 40 degrees will tend to produce excessively strong toner coloration and result in reduced image quality. The gloss is more preferably no greater than 30 degrees.

The toner of the invention also preferably has a mean particle size of no greater than 7 μm. This is because toner with a mean particle size of no greater than 7 μm will tend to exhibit a superior non-offset property and yield images with excellent gloss and resolution.

Examples of the present invention will now be explained, with the understanding that the invention is in no way limited thereto. The following methods were used for evaluation of the resins and toners referred to in the examples.

Resin Evaluation Methods

1) Softening Temperature

The temperature at which ½ of a 1.0 g sample flowed, when measured using a CFT-500 flow tester by Shimadzu Laboratories Co., Ltd., with a 1 mm φ×10 mm nozzle, a load of 294 N (30 Kgf) and constant speed temperature increase at a temperature elevating rate of 3° C./min.

2) Acid Value

The value as measured by titration with a KOH solution.

3) Glass Transition Temperature

The temperature at the intersection between the chart baseline and the tangent with the endothermic curve near the glass transition, as measured using a differential scanning calorimeter at a temperature elevating rate of 5° C./min.

Toner Evaluation Methods

4) Evaluation of Non-Offset Property

Printing was performed using a printer with a silicone oil coating free fixing roller, set to a roller speed of 100 mm/s and temperature adjustable, for evaluation of the non-offset property. The offset temperature was defined as the maximum temperature at which the toner migrated to the fixing roller during fixing, and the non-offset property was judged on the following scale.

⊚ (very good): offset temperature of ≧230° C.
○ (good): offset temperature of ≧220° C. and <230° C.
Δ (usable): offset temperature of ≧200° C. and <220° C.
× (poor): offset temperature of <200° C.

5) Fixing Property

The fixing temperature was defined as the minimum temperature at which the toner began to fix onto paper, where the toner was fixed onto the paper under the same conditions as for evaluation of the non-offset property.

⊚ (very good): fixing temperature of <120° C.
○ (good): fixing temperature of ≧120° C. and <130° C.
Δ (usable): fixing temperature of ≧130° C. and <160° C.
× (poor): fixing temperature of ≧160° C.

6) Blocking Resistance

Approximately 5 g of toner was weighed out, placed in a sample bottle and allowed to stand for about 24 hours in a drier heated to 50° C., and the degree of toner aggregation was evaluated as an index of the blocking resistance. The evaluation scale was as follows.

⊚ (very good): Dispersion by mere inversion of sample bottle
○ (good): Dispersion by inversion of sample bottle and tapping once
Δ (usable): Dispersion by inversion of sample bottle and tapping 2–3 times
× (poor) Dispersion by inversion of sample bottle and tapping 4–5 times 7) Image Stability The image stability was evaluated based on the toner charge after printing 10,000 sheets under the same conditions as for evaluation of the non-offset property.

⊚ (very good): Stable charge (image density)
○ (good): Slight difference between initial charge and final charge, but no effect on image density
Δ (usable): Change in charge (image density), but improvable with additives
× (poor): Large change in image density 8) Gloss A fixer with the printing speed set to 100 mm/sec and the temperature controlled to 140° C. was used to fix an image of toner onto paper with the toner density adjusted to 0.5–2.0 mg/cm$^2$, and a PG-1 glossmeter by Nippon Denshoku Industries Co., Ltd. was used to measure the gloss value at an incident angle of 75°.

Production of Polyester Resin for Toner

The charging composition monomer ingredients and release agent ingredients shown in Table 1 and 500 ppm of antimony trioxide with respect to the total acid components were loaded into a reactor equipped with a distillation column. The temperature was then gradually raised while maintaining a stirring blade rotation rate of 120 rpm in the reactor, by heating to a reaction system temperature of 260° C., and this temperature was sustained. Water flowed off from the reaction system and subsequently ceased after about 8 hours from the start of esterification, at which time the reaction was terminated. The temperature of the reaction system was then lowered and kept at 230° C. and the pressure in the reactor was reduced over a period of about 40 minutes to a vacuum degree of 1.0 mmHg for condensation reaction while distilling off the diol component from the reaction system. The viscosity of the reaction system increased as the reaction proceeded, and the vacuum degree was increased as the viscosity increased, with the condensation reaction being conducted until the torque of the stirring blade reached a value indicating the prescribed softening temperature. When the prescribed torque was indicated, the reaction system was returned to ordinary pressure, heating was terminated, the pressure was raised with nitrogen, and the reaction product was removed over a period of about 2 hours and gradually cooled over a period of 2 hours to obtain resins A to I.

Resins A to I obtained in this manner were subjected to compositional analysis by liquid-gas chromatography, confirming the resin compositions shown in Table 1. The properties of the resins are also shown in Table 1.

TABLE 1

| Resin | | | Resin A | Resin B | Resin C | Resin D | Resin E |
|---|---|---|---|---|---|---|---|
| Monomer charging composition | Acid components (mole fraction) | Trimellitic anhydride | 0.5 | — | 20.0 | 28.0 | 10.0 |
| | | Terephthalic acid | 99.5 | 100 | 50.0 | 72.0 | 90.0 |
| | | Isophthalic acid | — | — | 30.0 | — | — |
| | | Dodecenylsuccinic acid | — | — | — | — | — |
| | Alcohol components (mole fraction) | Diol A | 70.0 | 40.0 | 80.0 | 105 | 60.0 |
| | | Diol B | — | — | — | — | — |
| | | Ethylene glycol | 35.0 | 65.0 | 60.0 | 40.0 | 45.0 |
| | | Trimethylolpropane | — | 5.0 | — | — | — |

TABLE 1-continued

| | | | | | | | |
|---|---|---|---|---|---|---|---|
| Resin composition (mole fraction) | Acid components | Trimellitic anhydride | 0.6 | — | 19.9 | 27.9 | 9.8 |
| | | Terephthalic acid | 99.4 | 100 | 50.1 | 72.1 | 92.0 |
| | | Isophthalic acid | — | — | 30.0 | — | — |
| | Alcohol components | Diol A | 71.0 | 39.9 | 82.1 | 102 | 60.0 |
| | | Diol B | — | — | — | — | — |
| | | Ethylene glycol | 30.0 | 60.1 | 27.9 | 20.0 | 42.0 |
| | | Trimethylolpropane | — | 5.00 | — | — | — |
| | Release agent ingredient (wt %) | Carnauba wax | 8.0 | 5.0 | 2.0 | 0.5 | 1.0 |
| | | 110TS | — | — | — | — | — |
| Resin properties | | Softening temperature (° C.) | 105 | 120 | 140 | 150 | 140 |
| | | Tg (° C.) | 50.0 | 53.0 | 60.0 | 56.0 | 65.0 |
| | | Acid value (mgKOH/g) | 10.0 | 5.5 | 8.0 | 25.0 | 7.0 |
| | | Wax dispersion size (μm) | 3.0 | 2.0 | 1.5 | 0.5 | 1.0 |

| | | Resin | Resin F | Resin G | Resin H | Resin I |
|---|---|---|---|---|---|---|
| Charging composition (mole fraction) | Acid components | Trimellitic anhydride | 20.0 | 16.9 | 20.0 | — |
| | | Terephthalic acid | 50.0 | 42.2 | 50.0 | 100 |
| | | Isophthalic acid | 30.0 | — | 30.0 | — |
| | | Dodecenylsuccinic acid | — | 41.0 | — | — |
| | Alcohol components | Diol A | 80.0 | 48.6 | 80.0 | 70.0 |
| | | Diol B | — | 50.2 | — | — |
| | | Ethylene glycol | 60.0 | — | 60.0 | 35.0 |
| | | Trimethylolpropane | — | — | — | — |
| Resin composition (mole fraction) | Acid components | Trimellitic anhydride | 19.9 | 17.0 | 19.9 | — |
| | | Terephthalic acid | 50.1 | 42.1 | 50.0 | 100 |
| | | Isophthalic acid | 30.0 | — | 30.0 | — |
| | Alcohol components | Diol A | 82.1 | 41.0 | 82.0 | 71.0 |
| | | Diol B | — | 49.0 | — | — |
| | | Ethylene glycol | 27.9 | — | 27.7 | 30.0 |
| | | Trimethylolpropane | — | — | — | — |
| | Release agent ingredient (wt %) | Carnauba wax | — | — | — | — |
| | | 110TS | — | — | 2.0 | — |
| Resin properties | | Softening temperature (° C.) | 140 | 140 | 141 | 104 |
| | | Tg (° C.) | 62.0 | 61.2 | 60.5 | 50.5 |
| | | Acid value (mgKOH/g) | 8.5 | 2.0 | 7.5 | 10.8 |
| | | Wax dispersion size (μm) | — | — | 4.0 | — |

Diol A: Polyoxypropylene(2.3)-2,2-bis(4-hydroxyphenyl)propane
Diol B: Polyoxyethylene(2.3)-2,2-bis(4-hydroxyphenyl)propane
Carnauba wax: product of Toyo Petrolite, m.p.: 83° C.
110TS: Low molecular weight polypropylene wax, YUMEX 110TS (Sanyo Chemical Industries Co., Ltd., m.p.: 145° C.)

After melt blending 98 parts by weight of the resins containing no release agent ingredient (Resins F, G and I) and 2 parts by weight of carnauba wax using a twin-screw extruder controlled to an external temperature of 120° C., 2 g of the resulting blend was sampled and the dispersion size of the release agent ingredient in the polyester resin was measured by the method described above. The results were 20 μm for Resin F, 12.8 μm for Resin G and 15.2 μm for Resin I.

EXAMPLE 1

Resins A to E obtained above were used to prepare toners. Each toner included 89 parts by weight of the resin, 5 parts by weight of quinacridone pigment (E02, Clariant), 5 parts by weight of carnauba wax (Toyo Petrolite) and 1 part by weight of a negatively charged charge control agent (E-84, Orient Chemicals Corp.), and the ingredients were mixed for 30 minutes with a Henschel mixer. The mixture was then melt blended twice with a twin-screw extruder. The melt blending was carried out with the internal temperature set to the softening temperature of the resin. Cooling after blending yielded a toner mass which was finely pulverized with a jet mill pulverizer, and the toner particle sizes were ordered with a classifier for a particle size of 5 μm. Silica (R-972, Nihon Aerosil) was added at 0.25% to the obtained fine powder and adhered thereto by mixing with a Henschel mixer, to obtain the final toners A to E.

Toners A to E were evaluated as toners by the evaluation methods described above. The toner evaluation results are shown in Table 2. As seen in Table 2, the non-offset properties of Toners C and D were excellent, those of Toners B and E were good and that of Toner A was somewhat inferior but acceptable for use. The image stabilities of Toners B, C and E were excellent, that of Toner A was good and that of Toner D was inferior but an acceptable level for use. The blocking resistances of Toners C and E were excellent, those of Toners B and D were good, and that of Toner A was inferior but an acceptable level for use. The fixing property of Toner A was excellent, those of Toners B, C and E were good, and that of Toner D was somewhat inferior but an acceptable level for use. All of the toners exhibited the target values for gloss.

EXAMPLE 2

Toner F was produced and evaluated under the same conditions as in Example 1 except that 94 parts by weight of Resin C, 5 parts by weight of quinacridone pigment (E02, Clariant) and 1 part by weight of a negatively charged charge control agent (E-84, Orient Chemicals Corp.) were used in the toner. The results are shown in Table 2. Toner F exhibited an excellent non-offset property, image stability and blocking resistance, and the fixing property was also excellent. It also exhibited a high level of gloss.

EXAMPLE 3

Toner G was produced and evaluated under the same conditions as in Example 1 except that 71.9 parts by weight of Resin A, 22.1 parts by weight of Resin C, 5 parts by weight of quinacridone pigment (E02, Clariant) and 1 part by weight of a negatively charged charge control agent (E-84, Orient Chemicals Corp.) were used in the toner. The results are shown in Table 2. Toner G exhibited an excellent non-offset property and image stability, the blocking resistance was somewhat inferior but an acceptable level for use, and the fixing property was excellent. It also exhibited a high level of gloss.

EXAMPLE 4

Toner H was produced and evaluated under the same conditions as in Example 1 except that 94 parts by weight of Resin A, 5 parts by weight of Pigment Yellow 180 (Clariant) and 1 part by weight of a negatively charged charge control agent (E-84, Orient Chemicals Corp.) were used in the toner. The results are shown in Table 2. Toner H exhibited good image stability, the non-offset property and blocking resistance were somewhat inferior but acceptable levels for use, and the fixing property was excellent. It also exhibited a high level of gloss.

TABLE 2

|  | Toner | | | | | | | |
| --- | --- | --- | --- | --- | --- | --- | --- | --- |
|  | A | B | C | D | E | F | G | H |
| Non-offset property | Δ | ○ | ⊙ | ⊙ | ○ | ⊙ | ⊙ | Δ |
| Image stability | ○ | ⊙ | ⊙ | Δ | ⊙ | ⊙ | ⊙ | ○ |
| Blocking resistance | Δ | ○ | ⊙ | ○ | ⊙ | ⊙ | Δ | Δ |
| Fixing property | ⊙ | ○ | ○ | Δ | ○ | ⊙ | ⊙ | ⊙ |
| Gloss | 30.0 | 25.0 | 17.0 | 10.0 | 15.0 | 25.0 | 15.0 | 28.0 |

COMPARATIVE EXAMPLE 1

Resin F was used to prepare toner under the same conditions as in Example 1, and the resulting Toner CA was also evaluated under the same conditions as in Example 1. The results are shown in Table 3.

Toner CA exhibited an excellent non-offset property, image stability and blocking resistance, but its poor fixing property and low gloss made it unacceptable for use.

COMPARATIVE EXAMPLE 2

Toner CB was produced and evaluated under the same conditions as in Example 1, except that 88.8 parts by weight of Resin G, 7.1 parts by weight of quinacridone pigment (E02, Clariant), 2.7 parts by weight of polypropylene wax (VISCOL 660P, Sanyo Chemical Industries, m.p.: 145° C.) in place of carnauba wax and 1.3 parts by weight of the charge control agent BONTRON S-34 (Orient Chemicals Corp.) were used in the toner. The results are shown in Table 3. Toner CB exhibited excellent blocking resistance and the non-offset property was somewhat inferior but an acceptable level for use, but its inferior fixing property and image stability and low gloss made it unacceptable for use.

In addition, 95 parts by weight of Resin G and 5 parts by weight of polypropylene wax (VISCOL 660P, Sanyo Chemical Industries) were melt blended with a twin-screw extruder controlled to an external temperature of 120° C., and 2 g of the obtained melt blend mass (sample) was taken for measurement of the dispersion size of the release agent ingredient in the polyester resin by the method described above, giving a result of 15 μm.

COMPARATIVE EXAMPLE 3

Toner CC was produced and evaluated under the same conditions as in Example 1 except that 94 parts by weight of Resin H, 5 parts by weight of quinacridone pigment (E02, Clariant) and 1 part by weight of a negatively charged charge control agent (E-84, Orient Chemicals Corp.) were used in the toner. The results are shown in Table 3. Toner CC exhibited excellent blocking resistance and its non-offset property and image stability were somewhat inferior, although acceptable levels for use, but its inferior fixing property and low gloss made it unacceptable for use.

COMPARATIVE EXAMPLE 4

Toner CD was produced and evaluated under the same conditions as in Example 1, except that 22.1 parts by weight of Resin G and 66.9 parts by weight of Resin I were used. The results are shown in Table 3. Toner CD exhibited a somewhat inferior non-offset property, image stability, blocking resistance and fixing property, although acceptable levels for use, but its low gloss made it unacceptable for use.

COMPARATIVE EXAMPLE 5

Toner CE was produced and evaluated under the same conditions as in Example 1 except that 94 parts by weight of Resin I, 5 parts by weight of Pigment Yellow 180 (Clariant) and 1 part by weight of a negatively charged charge control agent (E-84, Orient Chemicals Corp.) were used in the toner. Toner CE exhibited a somewhat inferior fixing property and blocking resistance, although acceptable levels for use, but its inferior non-offset property and low image stability and gloss made it unacceptable for use.

TABLE 3

|  | Toner | | | | |
| --- | --- | --- | --- | --- | --- |
|  | CA | CB | CC | CD | CE |
| Non-offset property | ⊙ | Δ | Δ | Δ | X |
| Image stability | ⊙ | X | Δ | Δ | X |
| Blocking resistance | ⊙ | ○ | ○ | Δ | Δ |
| Fixing property | X | X | X | Δ | Δ |
| Gloss | 1.5 | 1.0 | 1.0 | 1.5 | 3.0 |

INDUSTRIAL APPLICABILITY

According to the present invention, it is possible to obtain polyester resins for toner that exhibit an excellent non-offset property, gloss, etc. by polymerizing polyester resin monomer ingredients in the presence of specific release agent ingredients.

The invention claimed is:

1. A process for producing a polyester resin for toner, which polyester resin comprises a tri- or higher polyvalent carboxylic acid component and/or a tri- or higher polyhydric alcohol component at 0.1-30 mole percent based on the total acid component, and which polyester resin has a softening temperature of 100-160° C., an acid value of 0.1-30 mgKOH/g and a glass transition temperature of 40-70° C., which process comprises conducting polymerization of said acid and alcohol components in the presence of a release agent ingredient comprising an alcohol component.

2. The process according to claim 1, wherein the polyester comprises the release agent ingredient at 0.1–10 wt %.

3. The process according to claim 1, wherein the polyester comprises an aromatic diol component at 10–110 mole percent based on the total acid component.

4. A process according to claim 1, wherein the release agent ingredient is carnauba wax.

5. The process to claim 1, wherein the release agent ingredient is dispersed in the polyester resin, and the release agent ingredient has a dispersion size no greater than 5 µm.

* * * * *